H. E. GILBERT.
MEANS FOR CONTROLLING TEMPERATURES.
APPLICATION FILED SEPT. 10, 1913.
1,207,536.
Patented Dec. 5, 1916.
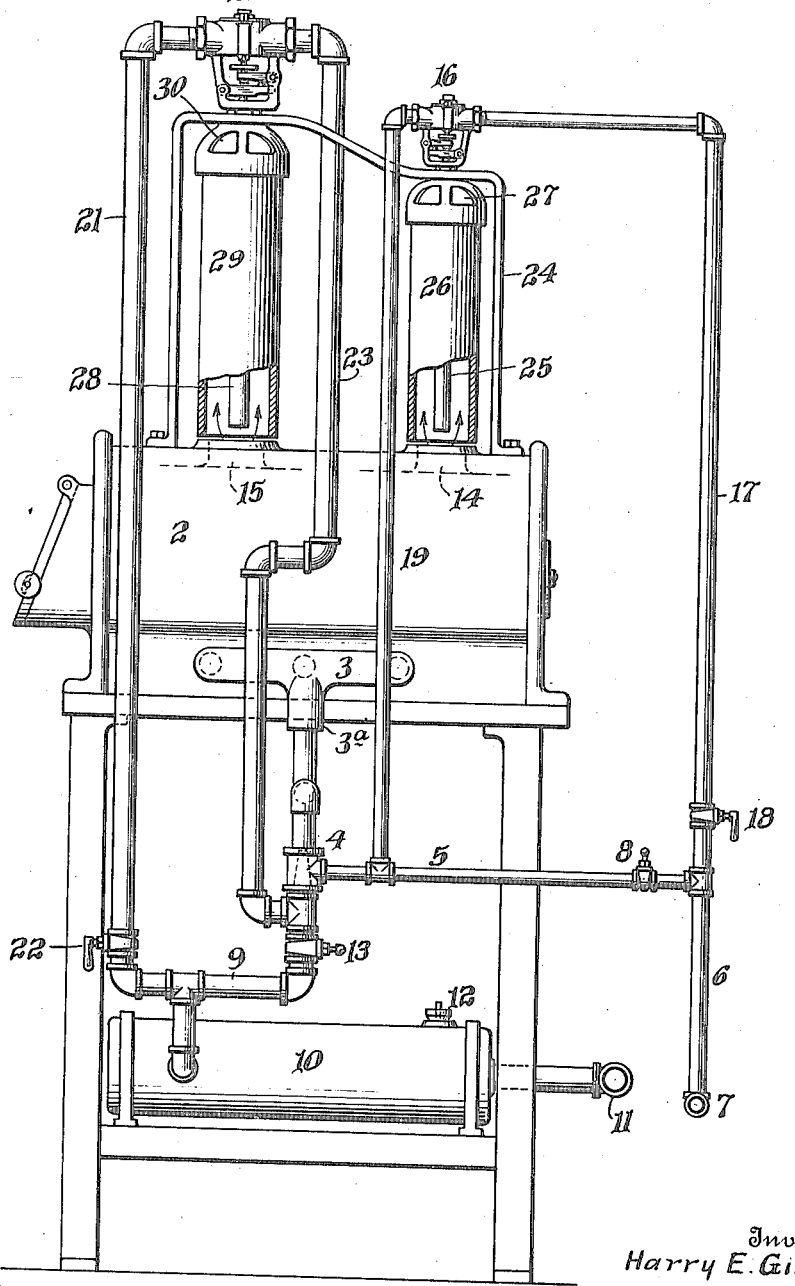
Inventor
Harry E. Gilbert

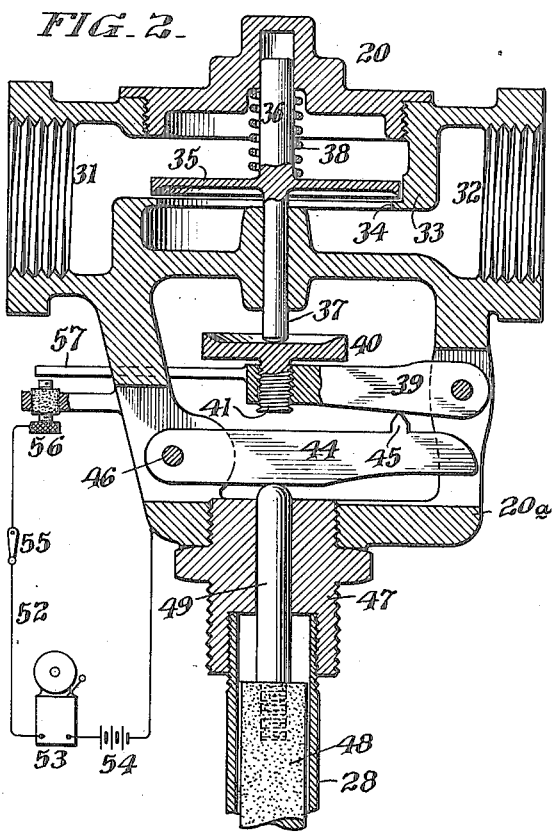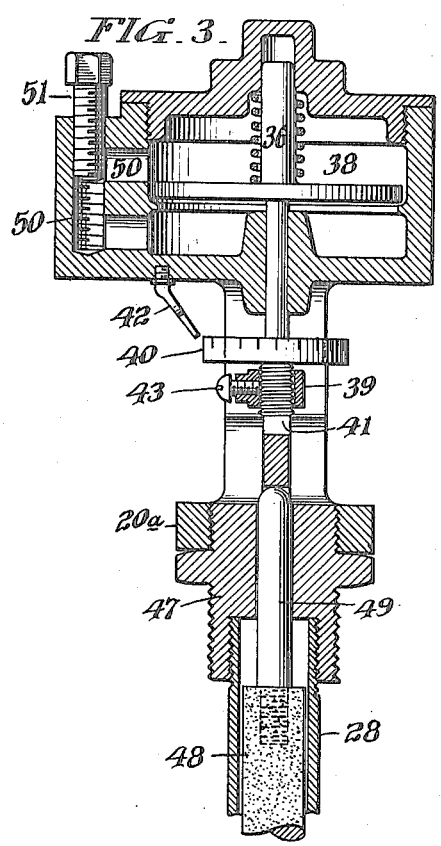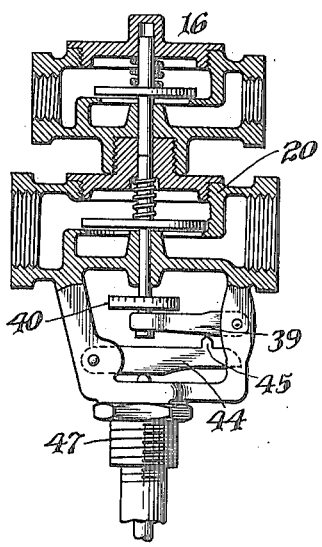

UNITED STATES PATENT OFFICE.

HARRY E. GILBERT, OF CONSHOHOCKEN, PENNSYLVANIA.

MEANS FOR CONTROLLING TEMPERATURES.

1,207,536.

Specification of Letters Patent.

Patented Dec. 5, 1916.

Application filed September 10, 1913. Serial No. 789,025.

*To all whom it may concern:*

Be it known that I, HARRY E. GILBERT, citizen of the United States, and resident of Conshohocken, county of Montgomery, and State of Pennsylvania, have invented an Improvement in Means for Controlling Temperatures, of which the following is a specification.

The object of my invention is to provide an improved method and means for burning gaseous fuel and automatically controlling the temperatures obtained so that, not only is the fuel burned under the most economical conditions, but the temperature may be indefinitely continued at a constant degree of heat.

Heretofore, in heating furnaces employing gas as the fuel, the air and gas are supplied to the furnace together, producing a more or less uncertain mixture, which is seldom or never of the proper composition to insure economical heating; and because of this, it has been difficult to maintain a constant temperature. In the most perfect combustion of gases, the oxygen should be supplied and intimately mixed with the carbon and hydrogen of the fuel in the exact proportions to provide the chemical requirements for full oxidation of the elements of the fuel, whereby the said chemical combinations may take place with explosive rapidity and without abnormal excess in any element; but as such theoretical requirements can only be approximately secured, because of the presence of large quantities of inert nitrogen (which necessarily has to be raised to high temperature itself) and the constantly varying chemical composition of the fuel gas being employed, it becomes necessary, in securing the best results in a simple manner, to provide means for separately controlling the supply of the fuel gas and of the air necessary to burn the same, and control these means automatically in accordance with the varying temperature conditions of the furnace, whereby an approximately uniform or constant predetermined temperature may be maintained.

To this end, my invention consists in means for supplying the fuel gas and the air to the furnace in separately measured quantities under the control of thermostatically operated means, so that the requisite supplies of fuel gas and air are automatically increased or decreased in accordance with an inverse variation of the furnace temperature. These separate means may be independently operated by separate thermostatic devices, or by a single device simultaneously operating both means, said means constituting separately adjustable devices or valves for respectively controlling the supply of fuel gas and air.

In further refinement of my invention, I provide one or both of the valve devices, constituting the means for controlling the supply of fuel gas and air, with a by-pass about the valve controlled thoroughfare for providing a definite flow under the pressure maintained, and thereby only require the capacity of the valve controlled thoroughfare to be slightly in excess of the regulation requirements. As a result of this, the valve device may be much smaller than if no by-pass were employed, and the accuracy of the regulation is more uniform because of the fact that the main flow is caused to pass through a fixed orifice under a constant head or pressure. The size of this by-pass orifice is hand regulated by previous test to insure the most satisfactory results, after which it remains constant. By this means, the same valve devices may be employed with furnaces of different sizes and supply in such furnaces different quantities of fuel gas and air to suit the capacities and requirements of the same.

In the further adaptation of my invention to commercial requirements, I prefer to provide the furnace with hand controlled means for gas and air in addition to the thermostatically controlled means, whereby the furnace may be brought to a high temperature before the thermostatically controlled means is depended upon to maintain the temperature predetermined upon. In this case, it is preferable to raise the temperature slightly in excess of the specific requirements and then allow it to become automatically lowered to said required temperature under the control of the thermostatic valve devices of both the fuel gas and air.

My invention also comprehends specific improvements and details which, together with the features above specified, will be better understood by reference to the drawings, in which:—

Figure 1 is a side elevation of a heating furnace having applied thereto certain features of construction embodying my invention; Figs. 2 and 3 are sectional elevations to the valve structure of the thermostatic devices for controlling the flow of the fuel gas and air; and Fig. 4 is a similar sectional elevation showing the valves for gas and air controlled by one thermostatic means.

2 is a gas heated furnace of any suitable construction, and while shown as intended for heating metals for tempering, welding or annealing, may be considered as a conventional showing of any gas heated furnace, such as for melting metals, a muffle furnace, a cupelling furnace, drying ovens, or for any other commercial requirement where substantially constant temperature may be required. The gas and air may be supplied to the furnace by twyers 3, from the mixing chamber 3ª and received from a pipe in which the gas is delivered from pipe 5 and air from pipe 9 through a mixing nozzle 4. The gas main 7 is connected with pipe 5 by a pipe 6 and its supply through pipe 5 may be regulated by a hand controlled valve 8. The air main 11 leads from a pressure blower or other usual source of air pressure and delivers into a pressure chamber 10 from which the air passes into pipe 9, aforesaid. The pressure tank 10 has a pressure relief valve 12 of usual construction, whereby the air delivered to the furnace shall be under constant pressure notwithstanding the possible variations due to irregularity of the blower or other source. The supply of air to the furnace through the pipe 9 may be regulated by a hand controlled valve 13. This much of the furnace equipments is as it has heretofore been employed, and may be now employed with my invention when preparing the preliminary heating of the furnace prior to automatic regulation.

16 is an automatic valve for controlling the supply of gas to the furnace and 20 is an automatic valve for controlling the supply of air to the furnace, each of these valves 16 and 20 being thermostatically controlled by the head conditions of the furnace.

A pipe 17 having a shut-off valve 18 connects the gas pipe 6 with the inlet of the automatic valve 16, the outlet of said valve being connected by a gas pipe 19 with the pipe 5, said arrangement causing gas to pass from the main 7 through the regulating automatic valve 16 and thence to the mixing nozzle 4 leading to the twyers of the furnace.

The automatic valve 20 for controlling the supply of air to the furnace has its inlet connected with a pipe 21 communicating with the tank 10 through pipe 9, and is provided with a shut-off valve 22, and said valve has its outlet connected by a pipe 23 with the mixing nozzle 4, where the air is mixed with the gas before passing to the twyers.

It will be understood that if the valves 8 and 13 are shut off and valves 18 and 22 are opened, all of the gas and air will pass through the valves 16 and 20 before being delivered to the furnace; and that by automatically controlling the operation of these valves the required quantities of the fuel gas and air will be mixed to maintain a constant temperature to be predetermined upon in the manner to be later described. These valves 16 and 20 are clamped upon a suitable frame 24 attached to the furnace and have thermostatic members 25 and 28 inclosing members 48, by which their valve pieces 35 are automatically operated. These thermostatic members are arranged to project downward from the frame 24 and are respectively surrounded by draft casings 26 and 29 which have their lower ends fitted relatively close to the escape outlets 14 and 15 through which a portion of the heated products of combustion pass from the furnace the gases escaping from under the lower edges of the casings, and said casings have their upper ends respectively provided with caps 27 and 30 which are attached to the frame 24 by being screwed upon the nipples 47 of the thermostatic valves, said caps being made with vent openings to provide escape for the heated products passing upward about the thermostats, and also acting as the direct means for supporting the draft casings.

The thermostatically operated valves 16 and 20 may be made in any suitable manner, as I do not restrict myself in this respect, but by way of example I have shown a construction for these valves which I have found well adapted for the purposes of my invention, and I will now briefly describe the same, having more particular reference to Figs. 2 and 3. As the valves 16 and 20 are the same in construction, it will suffice to describe valve 20, which I will now proceed to do.

The valve body has the inlet 31 and outlet 32 separated by a valve controlled thoroughfare formed with the partition 33 having the valve port and seat 34. A valve piece 35 controls the flow of air or gas through the valve port from inlet to outlet. This valve piece 35 has an upwardly extending stem 36 guided in the cap or bonnet and surrounded by a spring 38 for forcing the valve piece 35 toward its seat to shut off the flow. The lower part of the valve piece has a stem 37 extending down through the body and resting upon an adjusting screw 41 having a disk head 40 by which to turn it. The peripheral edge of this head may have a scale thereon, whereby it may coöperate with a fixed pointer 42 to indicate the extent of hand adjustment of the valve piece in a vertical direction. The screw 41 is screwed into the end of an arm 39 pivoted to the head 20ª of the valve body, and by which the screw may be bodily moved up or down. This arm 39 is supported on a contacting knife edge 45 of a pivoted lever 44 also pivoted to the head 20ᵃ at 46. The head 20ᵃ is screwed upon a nipple 47 carrying a pin 49 which is free to move therein and presses against the under side of the lever 44. Screwed into the lower part of the nipple 47 is a copper or other expansible metal tube 28, the lower end of which is permanently closed. Inclosed by and resting on the bottom of this tube 28, which is preferably of copper, is a rod 48 of carbon or other less expansible material or composition, the upper end of which supports the pin 49 and moves it longitudinally. It will now be understood that when the members 28 and 48 expand, they conjointly act through the levers 44 and 39 and the screw 41 to lower the valve piece 35 and restrict the flow of the air or gas; this tends to lower the temperature in the furnace to the predetermined degree. If the temperature tends to drop too much, the thermostatic members 28 and 48 will contract and open the valve piece 35 to a greater extent and thus cause an increased flow and consequent increase in temperature.

As it is not desirable to make the valve pieces 35 of the automatic valves directly control all of the gas or air which passes to the furnace, I provide the valve bodies with by-passes 50 between the inlet and outlet ports, and these I control by hand adjustable screws 51 (Fig. 3). By adjusting the screw 51 higher or lower, any desired size of static opening may be provided, which by the law of the flow of gases through orifices will permit a definite flow under constant pressure, the same being always somewhat less than the flow required to maintain the temperature desired, so as to give the thermostatic elements full opportunity of regulating the total flow to suit the predetermined requirements for maintenance of constant temperature. These by-passes and their means of adjustment may be made in any other suitable manner. Broadly considered, the pipes 5 and 9 and their respective valves 8 and 13 may be considered as by-passes around the valves 16 and 20, if so desired, though this is not their specific purpose in the installation as shown, they being, as before stated, for the purpose of giving a maximum supply of fuel gas and air for the preliminary heating of the furnace.

By the use of the adjusting screws 41 of the automatic valves, the degree of opening of the valve piece 35 may be regulated after the by-pass screw 51 has been approximately adjusted, so that more or less air may be permitted to pass to suit the chemical composition and volume of gas passing to the furnace. Both valves are preferably supplied with similar adjusting screws for the valve pieces, whereby the maximum permissible volume of gas may be regulated to suit the necessity of the heating, and then the air supply may be regulated commensurately with the gas supply, so that the mixture which passes the nozzle 4 and into the furnace is such as to produce approximately an explosive condition, namely one of perfect combustion. Of course, this exact apportionment of the fuel gas and oxygen to secure perfect chemical combustion without excess of oxygen, need not be followed, because there are already present the large quantities of nitrogen which must have its temperature raised to that of the furnace, but nevertheless all unnecessary dilution of the fuel gas with non-combustible gases or combustible gases in excess of the chemical requirements is detrimental to economical heating, one of the special objects of my improvements.

Not only, is the method of burning fuel gas by use of my apparatus economical by reason of the fact that I regulate the supply of fuel gas and oxygen to approximately the chemical requirements, but by automatically controlling the supply of these to maintain constant temperature, I prevent waste which necessarily arises from irregular combustion such as commonly takes place.

While I may supply two separate thermostatic elements for the respective valves 16 and 20, there are instances where a single thermostatic element to control both valves is more convenient, for example where there is only one outlet for the furnace or where the thermostatic element would be required to extend into the heating chamber of the furnace. It is not necessary or feasible to describe, in detail in this application, all of the different kinds or constructions of furnaces to which my invention may be applied, for it must be adapted in each case to suit the particular form of the furnace to be regulated, and I have only intended the illustration herewith shown to be taken as an example of the general application and usefulness of my improvements. In those cases where a single thermostatic element is to be used for both valves 16 and 20, the said valves may be arranged one above the other, as indicated in Fig. 4, in which the gas valve 16 is arranged above the air valve 20 and has its valve piece operated by the stem of the said air valve. In this case, the valve pieces may be accurately spaced so as to simultaneously seat upon their respective seats and rely upon the by-passes for the relative adjustment of the flow of the gas and air, or the respective valve pieces may have their independent adjustment as provided for when used separately, as will be readily understood by those skilled in the art.

While I have referred to gas as the fuel to be supplied and regulated by my improved apparatus, it will be manifest to those skilled in the art that a hydrocarbon fuel, such as oil, may be employed in place of gaseous fuel, and I therefore contemplate the use of my invention with either character of fuel.

While it is most important to provide a satisfactory thermostatic member and connecting means for controlling the valve or valves and while I have shown a construction which I have found to be satisfactory in actual use, I do not, however, restrict myself to any particular construction of thermostatically operated valve or valves, as these may be of any suitable construction adapted to the requirements of my improvements.

As it is desirable to know when the furnace has reached the maximum constant temperature desired, I may provide an automatic signal or indicator operated by the thermostatic member of one of the valves; and while this may be made in any suitable manner, I have by way of example shown a convenient construction in connection with Fig. 2 of the drawings. 53 is an electric bell or other electrically actuated indicator. 54 is an electric battery, 52 an electric circuit including the battery and indicator or alarm. This circuit may have a cut-out switch 55 and also be controlled by contacts 56 and 57 of the valve device. 56 is an adjustable contact screw insulated from the head 20ª and connecting with one terminal of the circuit 51. 57 is a contact finger and is an extension of a movable part of the valve devices and as shown of the lever or arm 39 thereof. The other terminal of the circuit 52 is connected with the head 20ª and hence in circuit with the finger 57. It will now be understood that when the maximum predetermined temperature has been reached, the arm 39 will have moved down to shut off the gas or air, as the case may be, and will close the circuit 52 and sound the alarm or indicate the presence of the maximum temperature. The attendant may then know that he may use the furnace for its intended purpose. If desired, the switch 55 may then be opened to avoid constant or repeated ringing of the bell or alarm. Any other suitable electrical indicator may be employed in lieu of that shown.

The special advantages of the use of my improved means resides in uniformity of heating, non-dependence upon watchfulness of attendant, automatic maintenance of constant temperature, economy in consumption of fuel gases, and rapidity and accuracy of results, all of which are secured by the control of the fuel gas and air in separate measured quantities under thermostatic control governed by the temperature conditions of the furnace.

It will further be apparent that by my improved apparatus I am able to automatically maintain a constant temperature in substantially any type of furnace or the like, and also automatically regulate and control the supply of fuel, be it either a liquid fuel or a gaseous fuel, and in conjunction with which the air for mixing purposes is also simultaneously controlled and regulated, and it will therefore be understood that I do not wish to be limited to any particular type or style of heating medium or burner system therefor.

I have disclosed and described in the present specification one type of apparatus which is at present preferred by me, but I am well aware that various changes and modifications of the same are susceptible, and therefore do not wish to be limited to the exact construction shown or described, and it will further be understood that while I have shown a gas furnace, the apparatus may just as well be employed in conjunction with a liquid fuel burner, or with a lead pot structure of any well known type.

Having now described my invention, what I claim as new and desire to secure by Letters Patent, is:—

1. In apparatus of the character stated, the furnace or oven, combined with a pipe to supply fuel to the furnace, a pipe to supply air to the furnace, a separate control valve in each of said pipes for separately controlling the supply of fuel and of air to the furnace, a by-pass about each of the valves whereby the larger portion of the fuel and air required may be fed through the respective pipes to the furnace or oven without passing through the regulating valves, and thermostatic means actuated by the temperature conditions of the furnace or oven for operating the separate control valves for fuel and air whereby the said fuel and air may be automatically supplied in independently regulated quantities.

2. In apparatus of the character stated, the furnace or oven, combined with a pipe to supply fuel to the furnace, a pipe to supply air to the furnace, a separate control valve in each of said pipes for separately controlling the supply of fuel and of air to the furnace, a by-pass about each of the valves whereby the larger portion of the fuel and air required may be fed through the respective pipes to the furnace or oven without passing through the regulating valves, hand adjustable means for said by-passes whereby definite static orifices may be provided to provide constant flow of fuel and air, and thermostatic means actuated by the temperature conditions of the furnace or oven for operating the separate control valves for fuel and air whereby the said fuel and air may be automatically supplied in independently regulated quantities.

3. In apparatus of the character stated, a furnace or oven having outlets for products of combustion, combined with a pipe to supply fuel to the furnace, a pipe to supply air to the furnace, a separate control valve in each of said pipes for separately controlling the supply of fuel and air to the furnace, and thermostatic means actuated by the temperature conditions of the furnace or oven for operating the separate control valves for fuel and air whereby said fuel and air may be independently and automatically supplied in regulated quantities, said means comprising thermostatic members having connection with the valves for operating them, casings respectively supported above the outlets from the furnace or oven and open at the bottom both to the outlets of the furnace and to the atmosphere and also having an outlet at the top said casings arranged for receiving and directing heated products of combustion passing from the furnace or oven to and over the expansible members, whereby moving currents of heated products may be permitted to pass toward and act upon the thermostatic members within the casings.

4. In apparatus of the character stated, a furnace or oven, combined with means for supplying air and fuel to the furnace or oven, separately operating thermostatically controlled valve devices for independently controlling the supply of air and fuel to the furnace or oven in accordance with the temperature requirements thereof, and separate hand controlled means for by-passing air and fuel to the furnace or oven about the thermostatically controlled valves but without affecting their normal operation.

5. In apparatus of the character stated, the combination of the furnace or oven, with hand controlled means for supplying fuel and air to the furnace or oven having therein separate automatic valves for separately measuring the fuel and air supplied automatically to the furnace or oven, and thermostatic devices energized by the temperature conditions of the furnace or oven for automatically operating the said automatic fuel and air valves, whereby the temperature of the furnace or oven may be quickly raised to the maximum temperature under hand control and then be automatically maintained.

6. In apparatus of the character stated, the furnace or oven, combined with a pipe to supply fuel to the furnace, a pipe to supply air to the furnace, a separate control valve in each of said pipes for separately controlling the supply of fuel and of air to the furnace, a by-pass about each of the valves whereby the larger portion of the fuel and air required may be fed through the respective pipes to the furnace or oven without passing through the regulating valves, thermostatic means actuated by the temperature conditions of the furnace or oven for operating the separate control valves for fuel and air whereby the said gas and air may be automatically supplied in independently regulated quantities, and means for varying the operation of said thermostatic means to govern the amount of opening of the separate control valves with respect to a given temperature.

7. In apparatus of the character stated, the combination of the furnace or oven, with hand controlled means for supplying fuel and air to the furnace or oven having therein separate automatic valves for separately measuring the fuel and air supplied automatically to the furnace or oven, thermostatic devices energized by the temperature conditions of the furnace or oven for automatically operating the said automatic fuel and air valves, whereby the temperature of the furnace or oven may be quickly raised to the maximum temperature under hand control and then be automatically maintained, and means for varying the operation of said thermostatic devices to govern the amount of opening of the separate control valves with respect to a given temperature.

In testimony of which invention, I hereunto set my hand.

HARRY E. GILBERT.

Witnesses:
HERBERT F. LEWIS,
MORRIS L. KOLB.